United States Patent
Lee et al.

(10) Patent No.: US 9,713,142 B2
(45) Date of Patent: Jul. 18, 2017

(54) METHOD AND APPARATUS FOR MANAGING DATA RADIO BEARERS FOR DUAL CONNECTIVITY IN WIRELESS COMMUNICATION SYSTEM

(71) Applicant: LG ELECTRONICS INC., Seoul (KR)

(72) Inventors: Insun Lee, Seoul (KR); Daewook Byun, Seoul (KR); Jian Xu, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 14/896,646

(22) PCT Filed: Jul. 14, 2014

(86) PCT No.: PCT/KR2014/006303
§ 371 (c)(1),
(2) Date: Dec. 7, 2015

(87) PCT Pub. No.: WO2015/008989
PCT Pub. Date: Jan. 22, 2015

(65) Prior Publication Data
US 2016/0135174 A1   May 12, 2016

Related U.S. Application Data

(60) Provisional application No. 61/846,051, filed on Jul. 14, 2013.

(51) Int. Cl.
*H04W 72/04* (2009.01)
*H04W 76/02* (2009.01)
(Continued)

(52) U.S. Cl.
CPC ....... *H04W 72/0426* (2013.01); *H04W 76/02* (2013.01); *H04W 76/025* (2013.01); *H04W 76/046* (2013.01); *H04W 92/20* (2013.01)

(58) Field of Classification Search
CPC . H04W 72/04; H04W 72/0426; H04W 76/02; H04W 76/025; H04W 76/04; H04W 76/046; H04W 92/20
See application file for complete search history.

(56) References Cited

U.S. PATENT DOCUMENTS 9,526,044 B2 * 12/2016 Choi ................ H04W 36/0072
2010/0049843 A1    2/2010 Xiong et al.
(Continued)

FOREIGN PATENT DOCUMENTS

WO   2013/028559    2/2013

OTHER PUBLICATIONS

LG Electronics, "RAN1 issues for support of dual connectivity with small cell," 3GPP TSG RAN WG1 #73, R1-132240, May 2013, 6 pages.

(Continued)

*Primary Examiner* — Tri H Phan
(74) *Attorney, Agent, or Firm* — Lee, Hong, Degerman, Kang & Waimey PC

(57) ABSTRACT

A method and apparatus for establishing/modifying/releasing data radio bearers (DRBs) in a wireless communication system is provided. A master eNodeB (MeNB) in dual connectivity transmits a request message, which includes information on E-UTRAN radio access bearers (E-RABs) to be set up/modified/released, to a secondary eNB (SeNB) in dual connectivity through an X2 interface;\, and receives a response message, which includes radio resource control (RRC) connection reconfiguration related information based on the E-RABs to be set up/modified/released, as a response to the request message from the SeNB through the X2 interface.

14 Claims, 17 Drawing Sheets

(51) Int. Cl.
*H04W 76/04* (2009.01)
*H04W 92/20* (2009.01)

(56) References Cited

U.S. PATENT DOCUMENTS

| | | | |
|---|---|---|---|
| 2011/0044249 A1 | 2/2011 | Wu et al. | |
| 2013/0044709 A1* | 2/2013 | Adjakple | H04W 76/025 370/329 |
| 2014/0241317 A1* | 8/2014 | Jamadagni | H04W 76/025 370/331 |
| 2015/0124748 A1* | 5/2015 | Park | H04L 5/0032 370/329 |
| 2015/0358866 A1* | 12/2015 | Xu | H04W 36/00 370/331 |
| 2016/0135103 A1* | 5/2016 | Lee | H04W 28/08 455/444 |

OTHER PUBLICATIONS

LG Electronics, RAN1 related issues for support of dual connectivity between macro cell and small cell, 3GPP TSG RAN WG1 #72bis, R1-131300, Apr. 2013, 6 pages.
PCT International Application No. PCT/KR2014/006303, Written Opinion of the International Searching Authority dated Oct. 28, 2014, 1 page.

\* cited by examiner (a)

(b)

METHOD AND APPARATUS FOR MANAGING DATA RADIO BEARERS FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2014/006303, filed on Jul. 14, 2014, which claims the benefit of U.S. Provisional Application No. 61/846,051, filed on Jul. 14, 2013, the contents of which are all hereby incorporated by reference herein in their entirety.

BACKGROUND OF THE INVENTION

Field of the Invention

The present invention relates to wireless communications, and more particularly, to a method and apparatus for managing data radio bearers (DRBs) for dual connectivity in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

In order to accommodate heavily-increased data traffic of a mobile communication system, small cell enhancements have been discussed. Specifically, for one feature of the small cell enhancements, dual connectivity has been discussed. Dual connectivity is an operation where a given user equipment (UE) consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. An Xn interface may be defined between the MeNB and SeNB, and through the Xn interface, functions related to connectivity of a small cell can be performed. It is generally assumed that when the Xn interface exists, an X2 interface also exists. Bearer split refers to the ability to split a bearer over multiple eNBs in dual connectivity.

The SeNB in dual connectivity may or may not have an RRC entity. According to the presence of the RRC entity in the SeNB, detailed DRB management methods have not defined yet. A method for managing DRBs of the SeNB in dual connectivity effectively may be required.

SUMMARY OF THE INVENTION

The present invention provides a method and apparatus for managing data radio bearers (DRBs) in a wireless communication system. The present invention provides a method for managing DRBs of a secondary eNodeB (SeNB) through a master eNB (MeNB), when the SeNB does not have a radio resource control (RRC) entity of a user equipment (UE) which supports dual connectivity between the MeNB and the SeNB. The present invention provides a method for establishing/modifying/releasing DRBs of the SeNB through the MeNB, when the SeNB does not have an RRC entity of a UE which supports dual connectivity between the MeNB and the SeNB.

A method for establishing, by a master eNodeB (MeNB) in dual connectivity, data radio bearers (DRBs) in a wireless communication system is provided. The method includes receiving an E-RAB setup request message from a mobility management entity (MME), transmitting a request message, which includes information on E-UTRAN radio access bearers (E-RABs) to be set up, to a secondary eNB (SeNB) in dual connectivity through an X2 interface, receiving a response message, which includes radio resource control (RRC) connection reconfiguration related information based on the E-RABs to be set up, as a response to the request message from the SeNB through the X2 interface, and upon receiving the response message, transmitting an RRC connection reconfiguration message, which includes the RRC connection reconfiguration related information received via the response message, to a user equipment (UE).

In another aspect, a method for modifying, by a master eNodeB (MeNB) in dual connectivity, data radio bearers (DRBs) in a wireless communication system is provided. The method includes receiving an E-RAB modify request message from a mobility management entity (MME), transmitting an X2-E-RAB modify request message, which includes information on E-UTRAN radio access bearers (E-RABs) to be modified, to a secondary eNB (SeNB) in dual connectivity through an X2 interface, receiving an X2-E-RAB modify response message, which includes radio resource control (RRC) connection reconfiguration related information based on the E-RABs to be modified, as a response to the X2-E-RAB modify request message from the SeNB through the X2 interface, and upon receiving the X2-E-RAB modify response message, transmitting an RRC connection reconfiguration message, which includes the RRC connection reconfiguration related information received via the X2-E-RAB modify response message, to a user equipment (UE).

In another aspect, a method for releasing, by a master eNodeB (MeNB) in dual connectivity, data radio bearers (DRBs) in a wireless communication system is provided. The method includes receiving an E-RAB release command message from a mobility management entity (MME), transmitting an X2-E-RAB release command message, which includes information on E-UTRAN radio access bearers (E-RABs) to be released, to a secondary eNB (SeNB) in dual connectivity through an X2 interface, receiving an X2-E-RAB release response message, which includes radio resource control (RRC) connection reconfiguration related information based on the E-RABs to be released, as a response to the X2-E-RAB release command message from the SeNB through the X2 interface, and upon receiving the X2-E-RAB release response message, transmitting an RRC connection reconfiguration message, which includes the RRC connection reconfiguration related information received via the X2-E-RAB release response message, to a user equipment (UE).

When a UE supports dual connectivity between an MeNB and SeNB, by setting up/modifying/releasing evolved packet system (EPS) bearers of the SeNB through the MeNB, the UE can receive data service by using the SeNB, and radio resources can be utilized effectively.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Small cell enhancement is described. It may be referred to 3GPP TR 36.932 V12.0.0 (2012-12).

Figure 1:
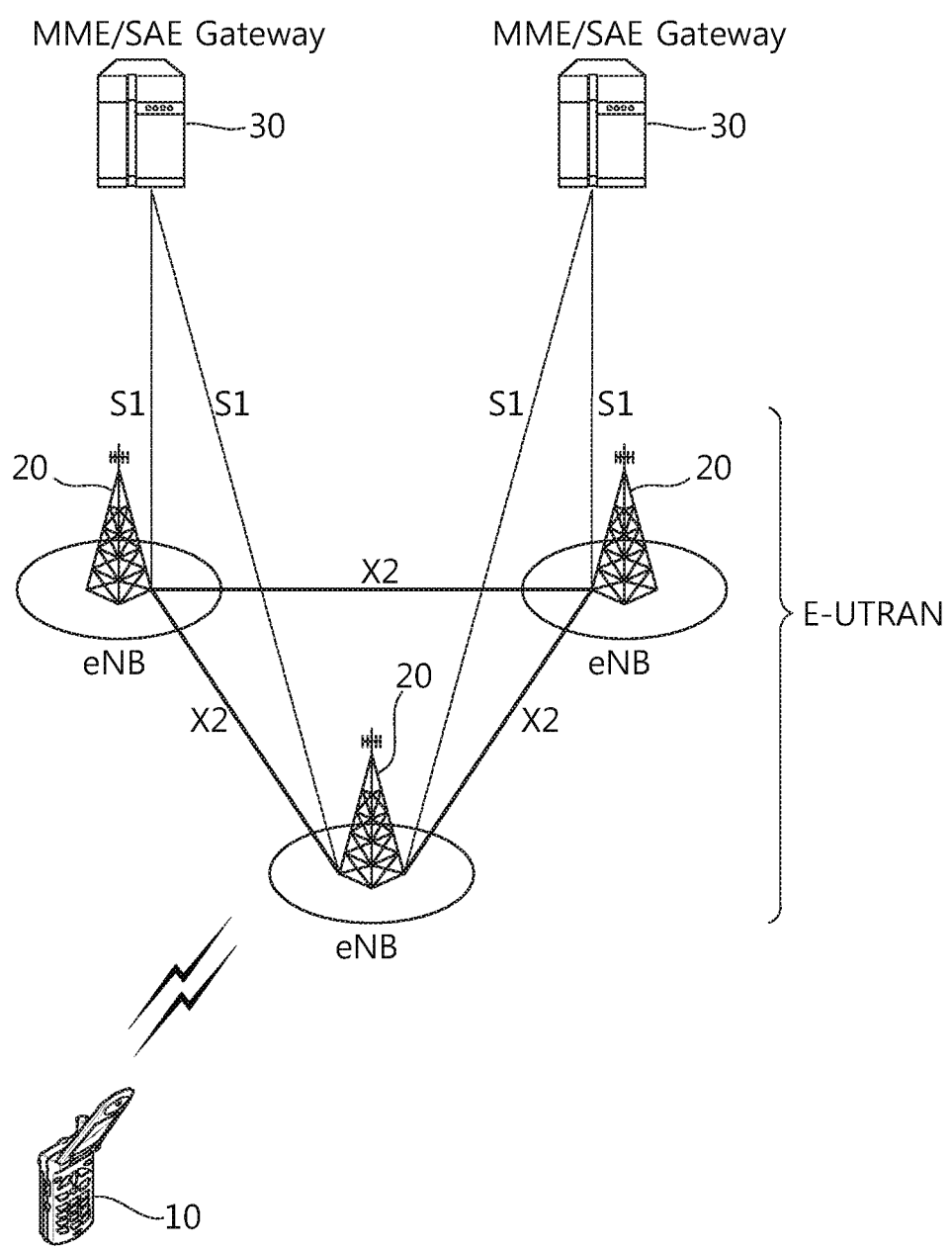
FIG. 1 shows LTE system architecture.
Figure 2:
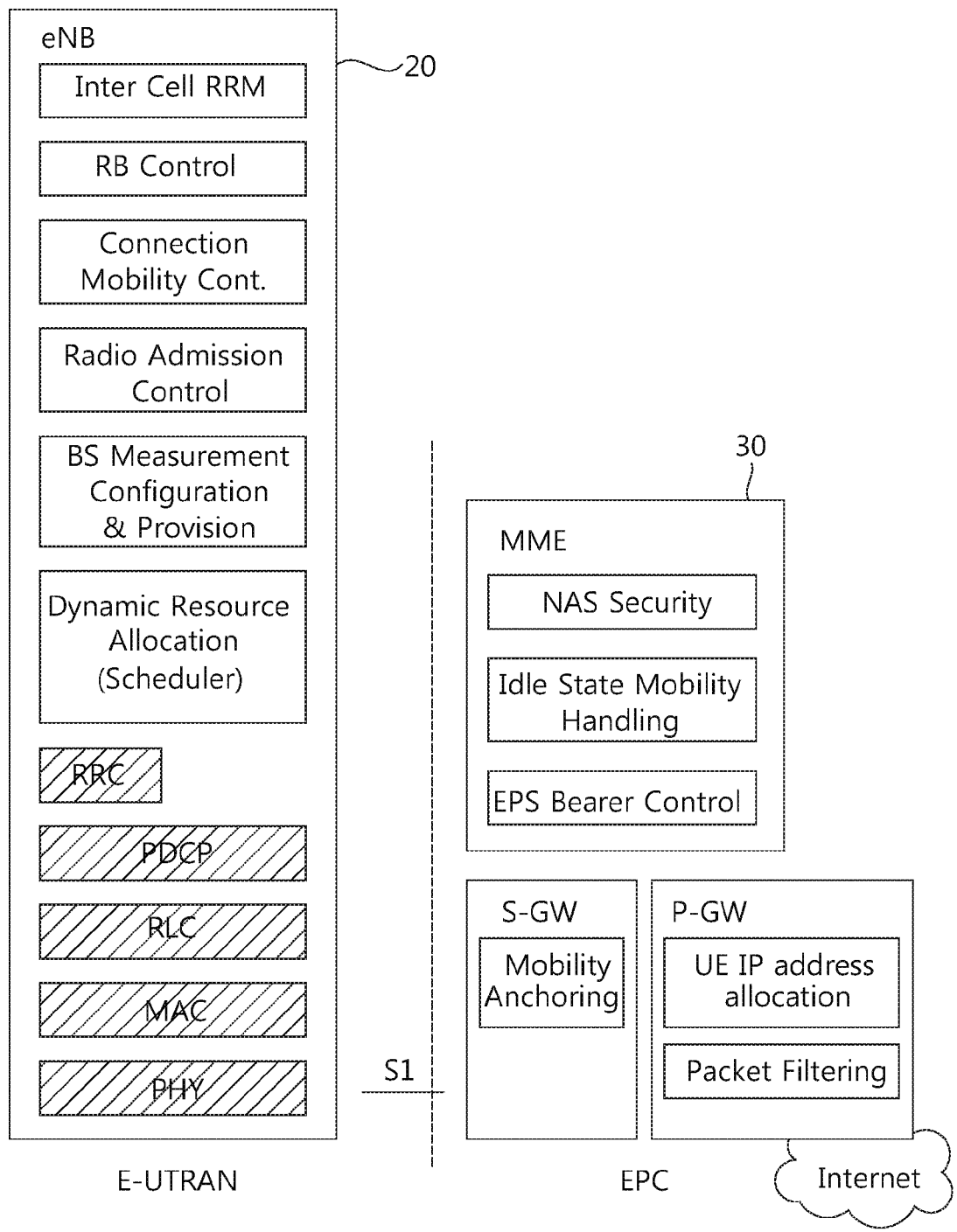
FIG. 2 shows a block diagram of architecture of a typical E-UTRAN and a typical EPC.
Figure 3:
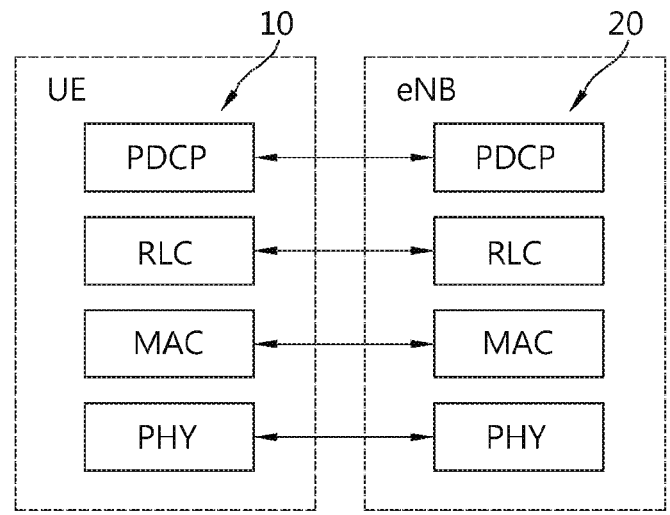
FIG. 3 shows a block diagram of a user plane protocol stack and a control plane protocol stack of an LTE system.
Figure 3:
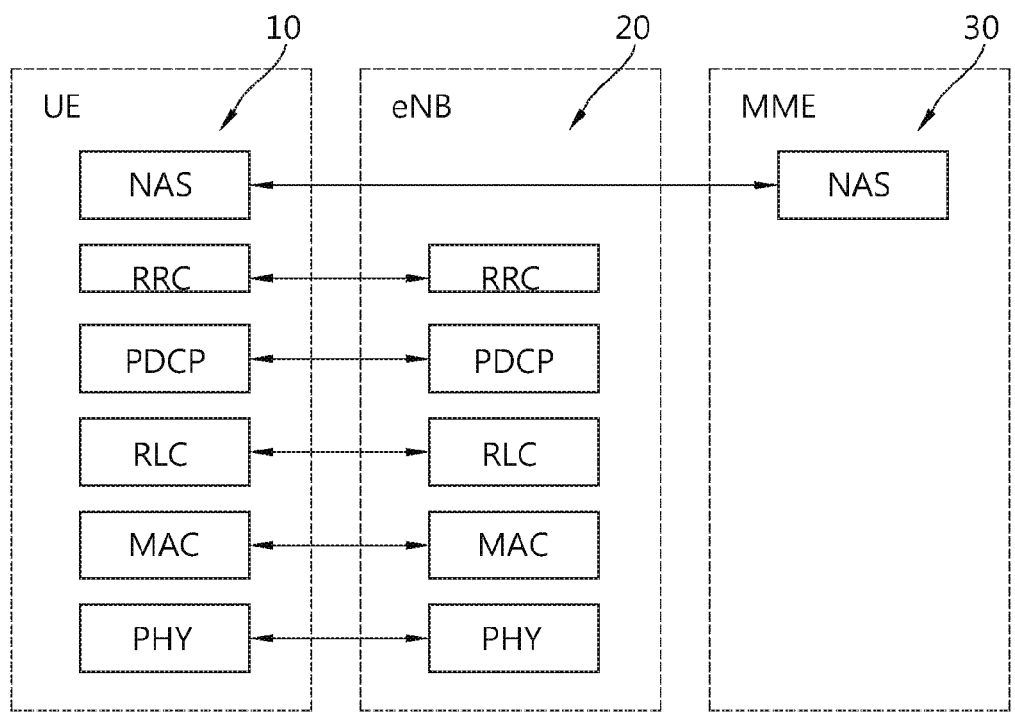
Figure 4:
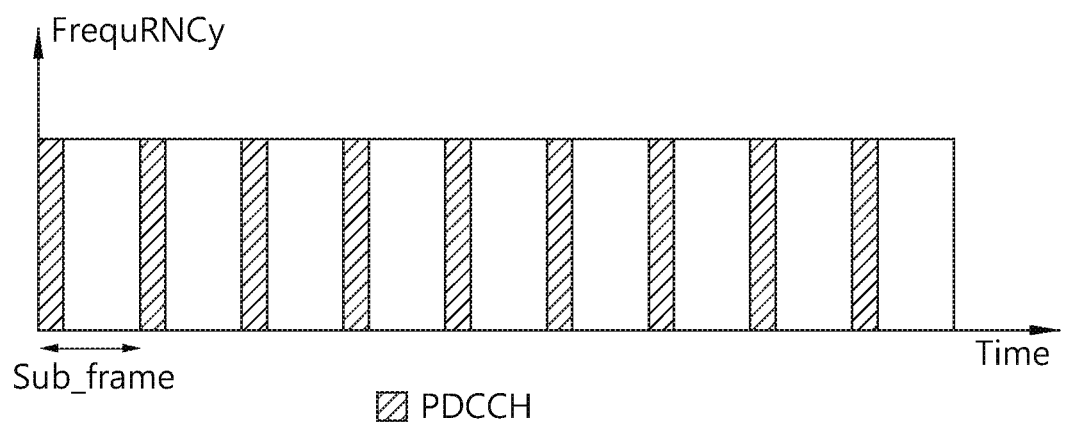
FIG. 4 shows an example of a physical channel structure.
Figure 5:
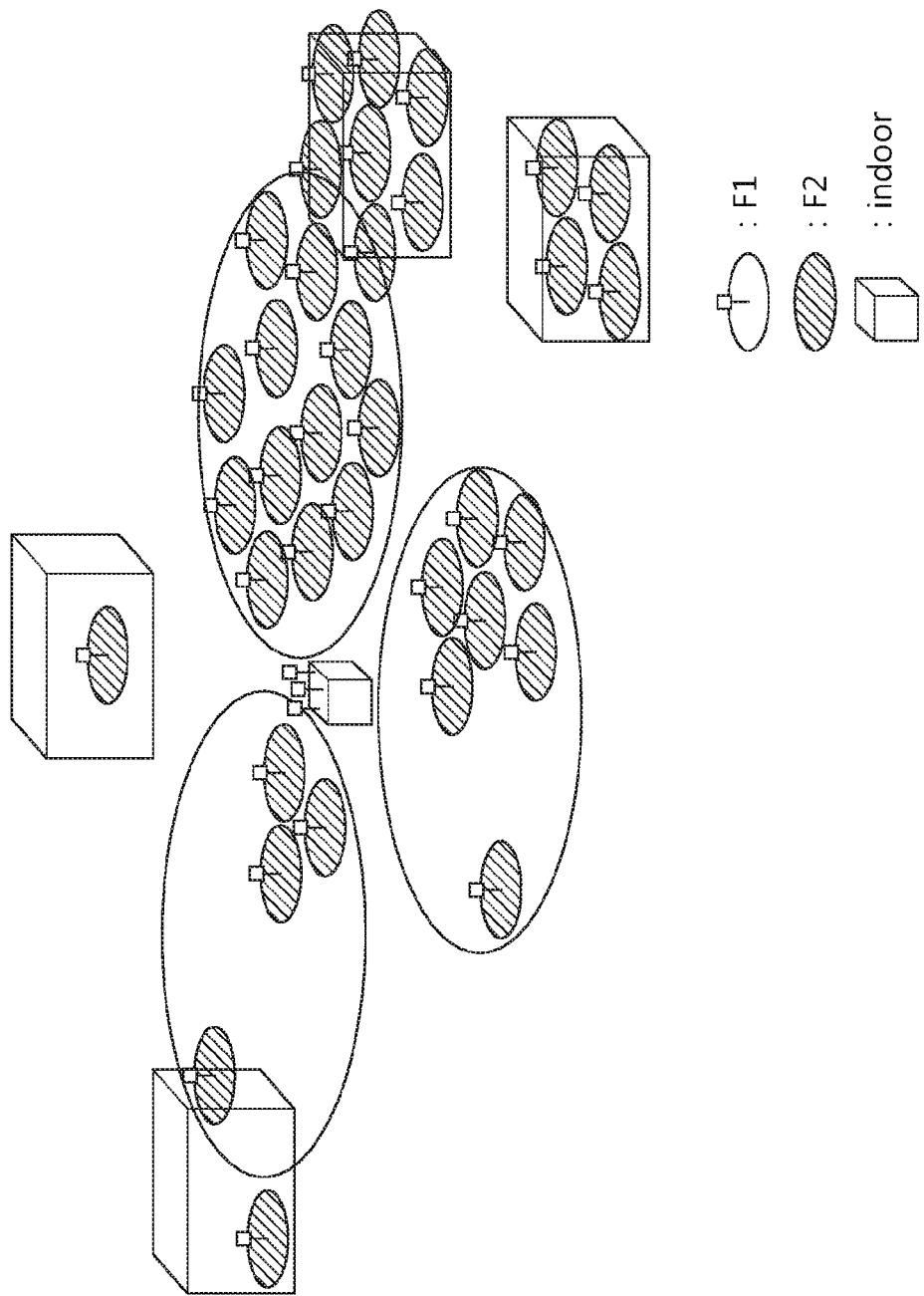
FIG. 5 shows deployment scenarios of small cells with/without macro coverage.

FIG. 5 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 5, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

For indoor UE, only low UE speed (0-3 km/h) is targeted. For outdoor, not only low UE speed, but also medium UE speed (up to 30 km/h and potentially higher speeds) is targeted.

Both throughput and mobility/connectivity shall be used as performance metric for both low and medium mobility. Cell edge performance (e.g. 5%-tile CDF point for user throughput) and power efficiency (of both network and UE) are also used as metrics.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multi-point (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Dual connectivity is described. It may be referred to 3GPP TR 36.842 V0.2.0 (2013-05).

Figure 6:
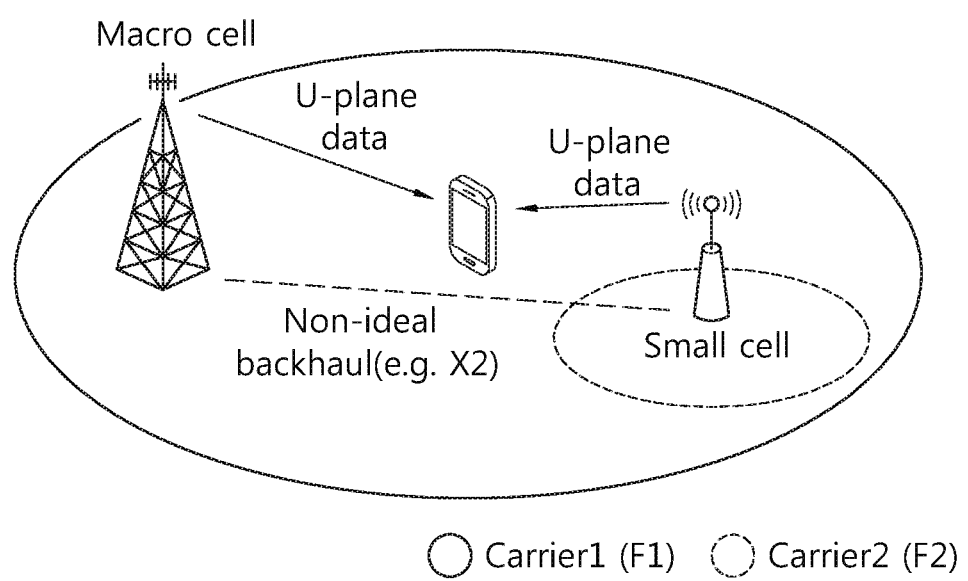
FIG. 6 shows an example of an inter-node radio resource aggregation.

FIG. 6 shows an example of an inter-node radio resource aggregation. In the form of dual connectivity, various potential solutions can be considered. Specifically, inter-node radio resource aggregation is a potential solution for improving per-user throughput. This can be done by aggregating radio resources in more than one eNB for user plane data transmission. Depending on realization of this solution, signaling overhead towards the CN can potentially be saved by keeping the mobility anchor in the macro cell.

Control plane architecture for dual connectivity is described.

At least the following RRC functions are relevant when considering adding small cell layer to the UE for dual connectivity operation:
  Small cell layer's common radio resource configurations
  Small cell layer's dedicated radio resource configurations
  Measurement and mobility control for small cell layer In dual connectivity operation, a UE always stays in a single RRC state, i.e., either RRC_CONNECTED or RRC_IDLE. With this principle, the main two architecture alternatives for RRC are the following:
  Option 1: Only the MeNB generates final RRC messages to be sent towards the UE after the coordination of radio resource management (RRM) functions between the MeNB and SeNB. The UE RRC entity sees all messages coming only from one entity (in the MeNB) and the UE only replies back to that entity.
  Option 2: The MeNB and SeNB can generate final RRC messages to be sent towards the UE after the coordination of RRM functions between the MeNB and SeNB and may send those directly to the UE (depending on L2 architecture) and the UE replies accordingly.

Figure 7:
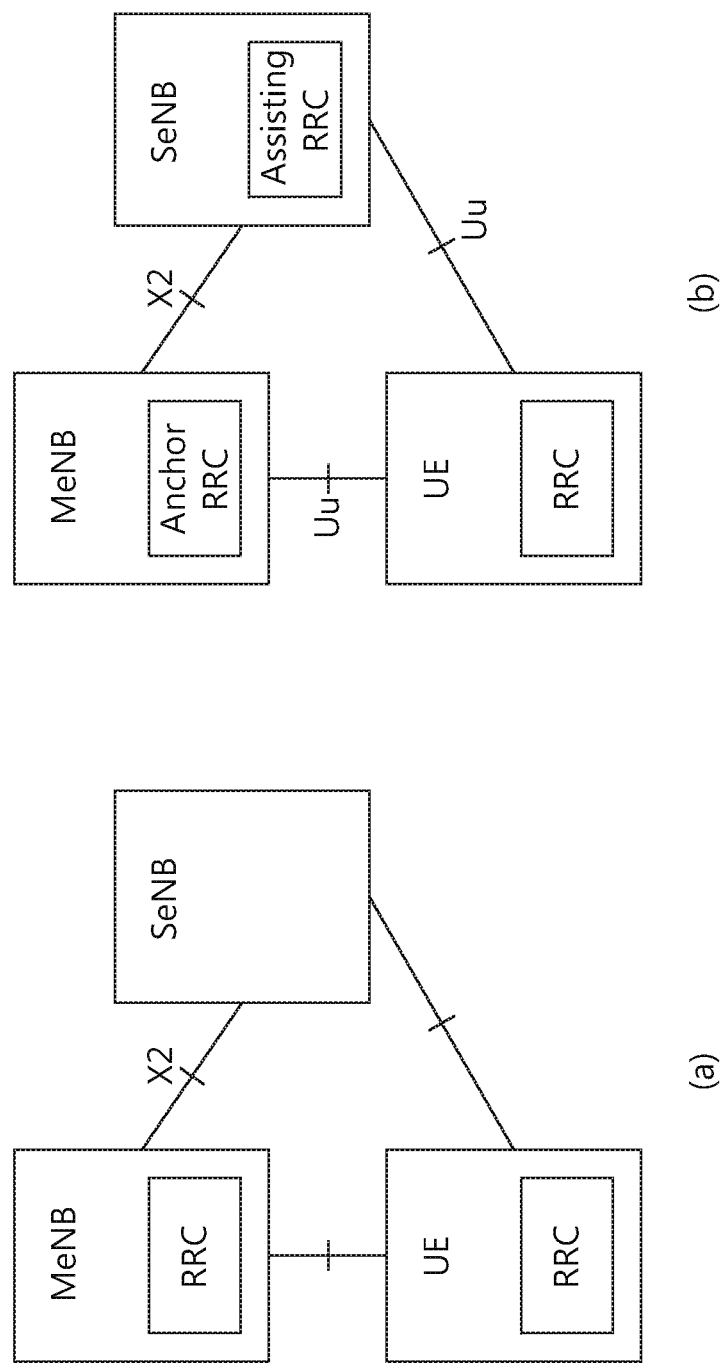
FIG. 7 shows architecture of a control plane for dual connectivity.

FIG. 7 shows architecture of a control plane for dual connectivity. FIG. 7 shows methods for splitting the control plane in dual connectivity. FIG. 7-(a) shows a case in which only the MeNB has an RRC entity for the UE, which corresponds to the option 1 above. In this case, since there is no RRC entity for the UE in the SeNB, radio resource configuration of the SeNB for the UE should be performed through the MeNB. FIG. 7-(b) shows a case in which both the MeNB and SeNB have RRC entities for the UE, which corresponds to the option 2 above. The MeNB has an anchor RRC entity for the UE, and the SeNB has an assisting RRC entity for the UE. In this case, the RRC entity in the SeNB may perform radio resource configuration of the SeNB for the UE.

User plane architecture for dual connectivity is described.

Dual connectivity consists in configuring a UE with one MeNB and at least one SeNB. When doing so, three options for splitting the U-Plane data may be considered as follows:

Option 1: S1-U also terminates in SeNB;
Option 2: S1-U terminates in MeNB, no bearer split in radio access network (RAN);
Option 3: S1-U terminates in MeNB, bearer split in RAN.

Figure 8:
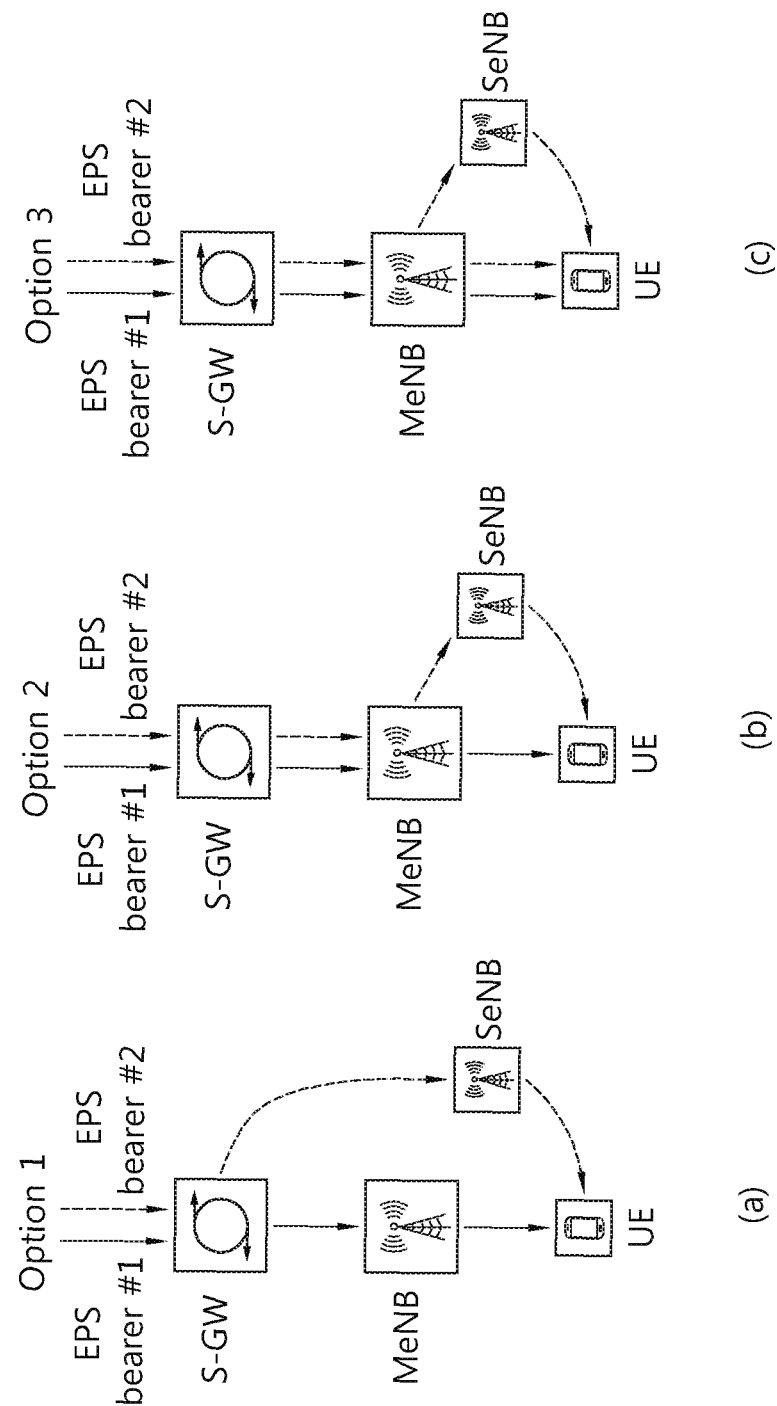
FIG. 8 shows bearer split options in dual connectivity.

FIG. 8 shows bearer split options in dual connectivity. FIG. 8-(a) shows option 1 described above, in which S11-U also terminates in the SeNB as well as in the MeNB. Referring to FIG. 8-(a), EPS bearers are divided at the S-GW, not at the MeNB. FIG. 8-(b) shows option 2 described above, in which S1-U terminates in the MeNB, and no bearer is split in RAN. Referring to FIG. 8-(b), different EPS bearers from each other (EPS bearer #1, EPS bearer #2) are divided at the MeNB. That is, an EPS bearer terminated in the MeNB (EPS bearer #1) and an EPS bearer to be set up at the SeNB (EPS bearer #2) are different from each other. FIG. 8-(c) shows option 3 described above, in which S1-U terminates in the MeNB, and bearer is split in RAN. Referring to FIG. 8-(c), one EPS bearer is split at the MeNB. That is, data service, which is to be served by the MeNB in one DRB, is split to the SeNB.

In terms of protocol architecture, when S1-U terminates in the MeNB, the protocol stack in the SeNB must at least support (re-)segmentation. This is due to the fact that (re-)segmentation is an operation that is tightly coupled to the physical interface, and when non-ideal backhaul is used, (re-)segmentation must take place in the same node as the one transmitting the RLC PDUs. Based on this assumption, four families of U-plane alternatives emerge:

A. Independent PDCPs: this option terminates the currently defined air-interface U-plane protocol stack completely per bearer at a given eNB, and is tailored to realize transmission of one EPS bearer by one node, but could also support splitting of a single EPS bearer for transmission by the MeNB and the SeNB with the help of an additional layer. The transmission of different bearers may still happen simultaneously from the MeNB and the SeNB.

B. Master-Slave PDCPs: this option assumes that S1-U terminates in the MeNB with at least part of the PDCP layer residing in the MeNB. In case of bearer split, there is a separate and independent RLC bearer, also at UE side, per eNB configured to deliver PDCP PDUs of the PDCP bearer, terminated in the MeNB.

C. Independent RLCs: this option assumes that S1-U terminates in the MeNB with the PDCP layer residing in the MeNB. In case of bearer split, there is a separate and independent RLC bearer, also at UE side, per eNB configured to deliver PDCP PDUs of the PDCP bearer, terminated in the MeNB.

D. Master-Slave RLCs: this option assumes that S1-U terminates in the MeNB with the PDCP layer and part of the RLC layer residing in the MeNB. While requiring only one RLC entity in the UE for the EPS bearer, on the network side the RLC functionality is distributed between the nodes involved, with a "slave RLC" operating in the SeNB. In downlink, the slave RLC takes care of the delay-critical RLC operation needed at the SeNB. It receives from the master RLC at the MeNB readily built RLC PDUs (with sequence number already assigned by the master RLC) that the master RLC has assigned for transmission by the slave RLC, and transmits them to the UE. The custom-fitting of these PDUs into the grants from the MAC scheduler is achieved by re-using the currently defined re-segmentation mechanism.

Based on the options 2 and 3 for bearer split described in FIG. 8-(b), (c), and U-plane protocol stack described above, the following alternatives may be considered:

2A: S1-U terminates in MeNB+no bearer split in MeNB+independent PDCP at SeNB;
2C: S1-U terminates in MeNB+no bearer split in MeNB+independent RLC at SeNB;
2D: S1-U terminates in MeNB+no bearer split in MeNB+master-slave RLCs;
3A: S1-U terminates in MeNB+bearer split in MeNB+independent PDCPs for split bearers;
3C: S1-U terminates in MeNB+bearer split in MeNB+independent RLCs for split bearers;
3D: S1-U terminates in MeNB+bearer split in MeNB+master-slave RLCs for split bearers.

Figure 9:
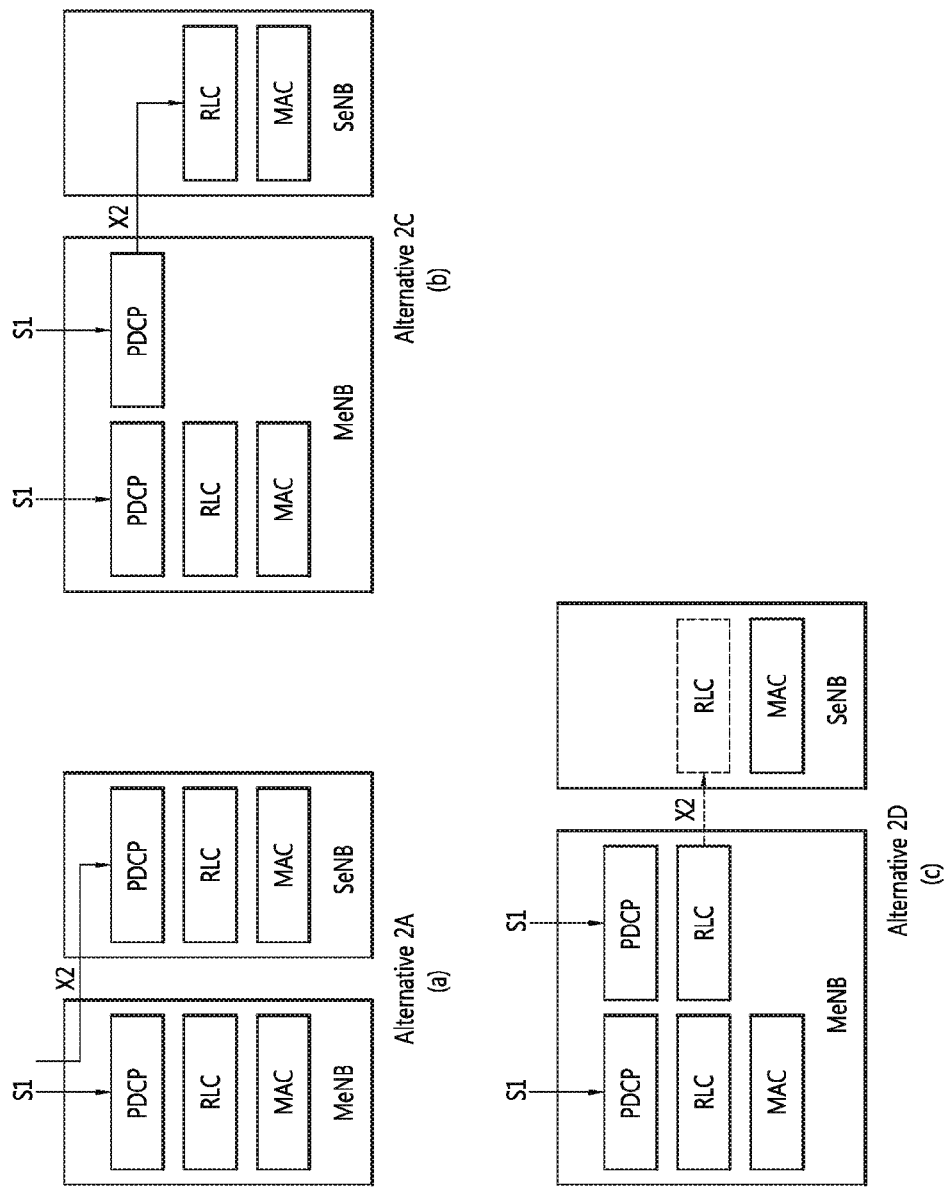
FIG. 9 shows U-plane protocol stack options for dual connectivity when S1-U terminates in an MeNB, and no bearer is split in RAN.

FIG. 9 shows U-plane protocol stack options for dual connectivity when S1-U terminates in an MeNB, and no bearer is split in RAN. FIG. 9-(a) shows the alternative 2A, which is the combination of S1-U that terminates in the MeNB+no bearer split in the MeNB+independent PDCP at the SeNB. FIG. 9-(b) shows the alternative 2C, which is the combination of S1-U that terminates in the MeNB+no bearer split in the MeNB+independent RLC at the SeNB. FIG. 9-(c) shows the alternative 2D, which is the combination of S1-U that terminates in the MeNB+no bearer split in the MeNB+master-slave RLCs.

Figure 10:
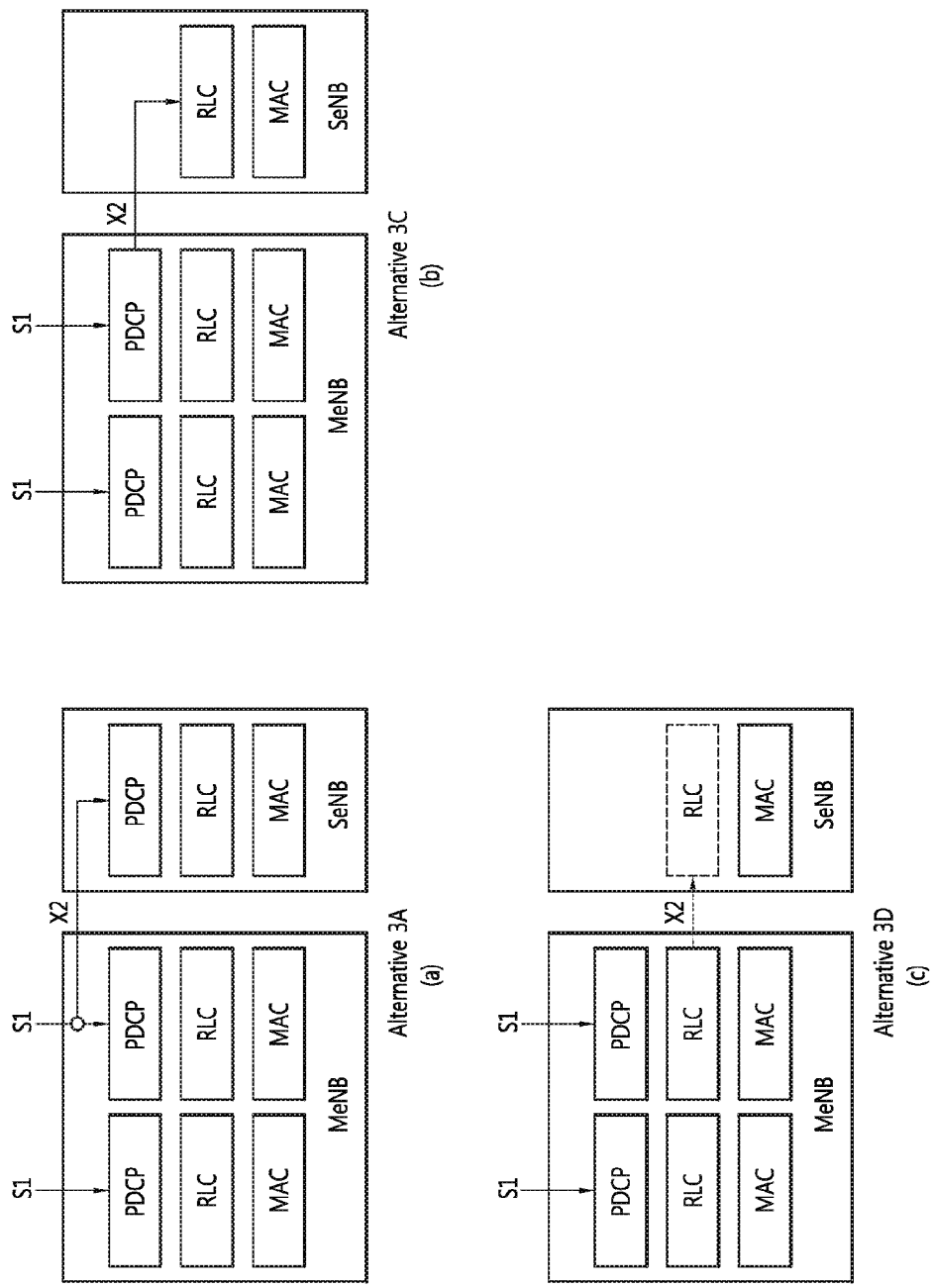
FIG. 10 shows U-plane protocol stack options for dual connectivity when S1-U terminates in an MeNB, and bearer is split in RAN.

FIG. 10 shows U-plane protocol stack options for dual connectivity when S1-U terminates in an MeNB, and bearer is split in RAN. FIG. 10-(a) shows the alternative 3A, which is the combination of S1-U that terminates in the MeNB+independent PDCPs for split bearers. FIG. 10-(b) shows the alternative 3C, which is the combination of S1-U that terminates in the MeNB+bearer split in the MeNB+independent RLCs for split bearers. FIG. 10-(c) shows the alternative 3D, which is the combination of S1-U that terminates in the MeNB+bearer split in the MeNB+master-slave RLCs for split bearers.

E-UTRAN radio access bearer (E-RAB) setup procedure is described. It may be referred Section 8.2.1 of 3GPP TS 36.413 V11.2.0 (2012-12).

Figure 11:
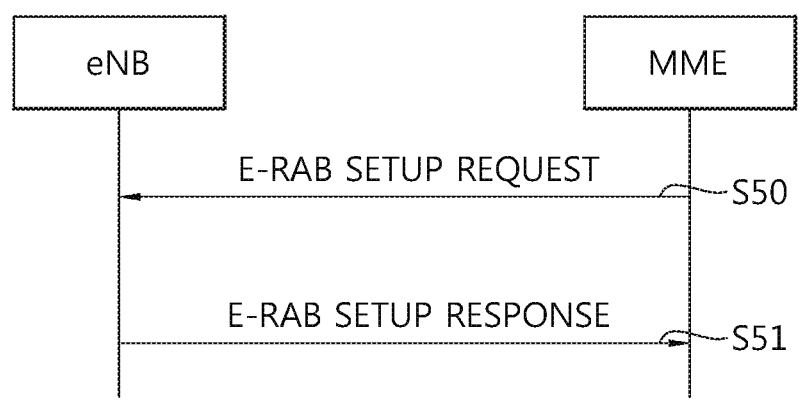
FIG. 11 shows an E-RAB setup procedure.

FIG. 11 shows an E-RAB setup procedure. The purpose of the E-RAB setup procedure is to assign resources on Uu and S1 for one or several E-RABs and to setup corresponding data radio bearers for a given UE. The procedure uses UE-associated signaling.

Referring to FIG. 11, in step S50, the MME initiates the procedure by sending an E-RAB SETUP REQUEST message to the eNB. The E-RAB SETUP REQUEST message shall contain the information required by the eNB to build the E-RAB configuration consisting of at least one E-RAB and for each E-RAB to setup include an E-RAB to be Setup Item IE.

Upon reception of the E-RAB SETUP REQUEST message, and if resources are available for the requested configuration, the eNB shall execute the requested E-RAB configuration. For each E-RAB and based on the E-RAB level QoS parameters IE the eNB shall establish a data radio bearer and allocate the required resources on Uu. The eNB shall pass the NAS-PDUIE and the value contained in the E-RAB ID IE received for the E-RAB for each established data radio bearer to the UE. The eNB does not send the NAS PDUs associated to the failed data radio bearers to the UE. The eNB shall allocate the required resources on S1 for the E-RABs requested to be established.

In step S51, the eNB shall report to the MME, in the E-RAB SETUP RESPONSE message, the result for all the requested E-RABs. A list of E-RABs which are successfully established shall be included in the E-RAB Setup List IE. A list of E-RABs which failed to be established, if any, shall be included in the E-RAB Failed to Setup List IE.

E-RAB modify procedure is described. It may be referred Section 8.2.2 of 3GPP TS 36.413 V11.2.0 (2012-12).

Figure 12:
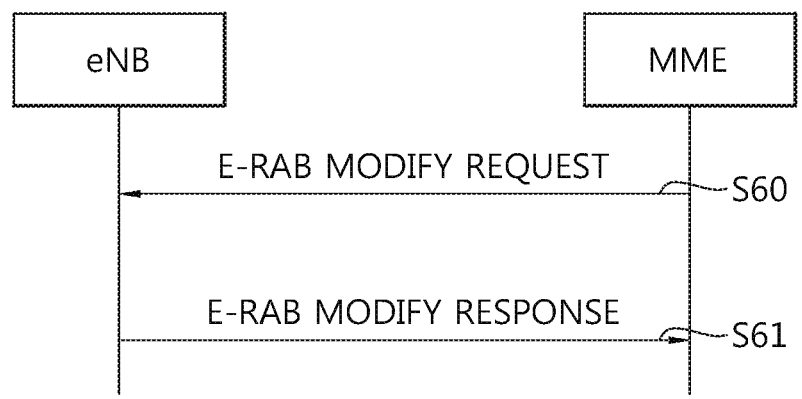
FIG. 12 shows an E-RAB modify procedure.

FIG. 12 shows an E-RAB modify procedure. The purpose of the E-RAB modify procedure is to enable modifications of already established E-RABs for a given UE. The procedure uses UE-associated signaling.

Referring to FIG. 12, in step S60, the MME initiates the procedure by sending an E-RAB MODIFY REQUEST message to the eNB. The E-RAB MODIFY REQUEST message shall contain the information required by the eNB to modify one or several E-RABs of the existing E-RAB configuration. Information shall be present in the E-RAB MODIFY REQUEST message only when any previously set value for the E-RAB configuration is requested to be modified.

Upon reception of the E-RAB MODIFY REQUEST message, and if resources are available for the requested target configuration, the eNB shall execute the modification of the requested E-RAB configuration. For each E-RAB that shall be modified and based on the new E-RAB level QoS parameters IE the eNB shall modify the data radio bearer configuration and change allocation of resources on Uu according to the new resource request. The eNB shall pass the NAS-PDUIE received for the E-RAB to the UE when modifying the data radio bearer configuration. The eNB does not send the NAS PDUs associated to the failed data radio bearers to the UE. The eNB shall change allocation of resources on S1 according to the new resource request.

In step S61, the eNB shall report to the MME, in the E-RAB MODIFY RESPONSE message, the result for all the requested E-RABs to be modified. A list of E-RABs which are successfully modified shall be included in the E-RAB Modify List IE. A list of E-RABs which failed to be modified, if any, shall be included in the E-RAB Failed to Modify List IE.

E-RAB release procedure is described. It may be referred Section 8.2.3 of 3GPP TS 36.413 V11.2.0 (2012-12).

Figure 13:
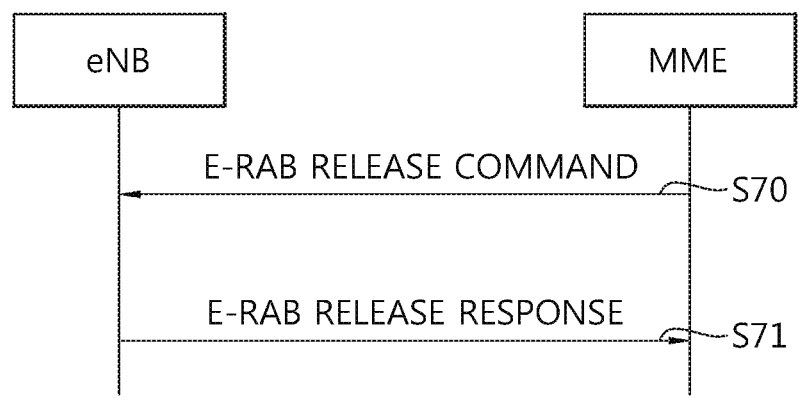
FIG. 13 shows an E-RAB release procedure.

FIG. 13 shows an E-RAB release procedure. The purpose of the E-RAB release procedure is to enable the release of already established E-RABs for a given UE. The procedure uses UE-associated signaling.

Referring to FIG. 13, in step S70, the MME initiates the procedure by sending an E-RAB RELEASE COMMAND message. The E-RAB RELEASE COMMAND message shall contain the information required by the eNB to release at least one E-RAB in the E-RAB To Be Released List IE. If a NAS-PDUIE is contained in the message, the eNB shall pass it to the UE.

Upon reception of the E-RAB RELEASE COMMAND message the eNB shall execute the release of the requested E-RABs. For each E-RAB to be released the eNB shall release the corresponding data radio bearer and release the allocated resources on Uu. The eNB shall pass the value contained in the E-RAB ID IE received for the E-RAB to the radio interface protocol for each data radio bearer to be released. The eNB shall release allocated resources on S1 for the E-RABs requested to be released.

In step S71, the eNB shall report to the MME, in the E-RAB RELEASE RESPONSE message, the result for all the E-RABs to be released. A list of E-RABs which are released successfully shall be included in the E-RAB Release List IE. A list of E-RABs which failed to be released, if any, shall be included in the E-RAB Failed to Release List IE.

When a UE establishes a connection with an eNB, the eNB may perform radio resource configuration for the UE. If the UE does not support dual connectivity, an RRC entity of the eNB, which is connected to the UE, may perform radio resource configuration for the UE. The radio resource configuration includes establishment/modification/release of DRBs, as described in FIG. 11 to FIG. 13. However, if the UE supports dual connectivity between an MeNB and SeNB, radio resource control of the SeNB, as well as radio resource control of the MeNB, is required. Even though two architectures have been discussed according to the presence of the RRC entity for the UE in the SeNB, as described above in FIG. 7, a DRB management method has not yet defined in detail. Specifically, a DRB management method has not yet defined when the SeNB does not have an RRC entity for the UE, as described above in FIG. 7-(a).

Hereinafter, a method for managing radio resources, in order to provide additional radio resources to the UE when the SeNB does not have an RRC entity for the UE, according to an embodiment of the present invention is described. According to an embodiment of the present invention, DRB management of the SeNB can be performed through the MeNB, since the SeNB does not have an RRC entity for the UE.

In the conventional art in which dual connectivity is not supported, upon receiving the E-RAB SETUP REQUEST message from the MME, the eNB may allocate radio resources, and may set up RBs by transmitting the RRCconnectionreconfiguration message to the UE. However, if dual connectivity is supported and the SeNB does not have an RRC entity for the UE, the MeNB should know information on RBs served through the SeNB, and deliver the information to the UE. More specifically, if dual connectivity is supported and the SeNB does not have an RRC entity for the UE, S1-MME of the UE terminates in the MeNB, as described above in FIG. 8-(b), (c). The SeNB should allocate additional radio resources to the UE, and accordingly, DRBs should be established/modified/released at the SeNB for data service of the UE. Since the SeNB does not have an RRC entity for the UE, information on DRBs of the SeNB, which is to be established/modified/released for data service of the UE, cannot be delivered to the UE by using the transmitting the RRCconnectionreconfiguration message as the conventional art. Accordingly, when data service of the UE is split from the MeNB to the SeNB, a method for managing DRBs of the SeNB for split data service may be required.

According to an embodiment of the present invention, the MeNB may transmit a request message for E-RAB setup, which is received from the MME, to the SeNB through an X2 interface. Upon receiving the request message for E-RAB setup, the SeNB may set up required DRBs, and transmit information on the DRBs to the MeNB through the X2 interface. The information on the DRBs can vary according to the bearer split options in dual connectivity described above in FIG. 8. Upon receiving the information on the DRBs, the MeNB may deliver the information on the DRBs to the UE. Upon receiving the information on the DRBs, the UE may set up DRBs, and transmit a response message to the MeNB. Upon receiving the response message, the MeNB may transmit a complete message which indicates completion of DRB setup of the UE to the SeNB. Therefore, DRBs of the SeNB can be managed through an RRC entity of the MeNB. It is assumed that the MeNB acknowledges RRC information of the SeNB, besides the information on DRBs, by pre-configuration. It is also assumed that one of the U-plane protocol stack options for dual connectivity, described above in FIGS. 9 and 10, is used.

Figure 14:
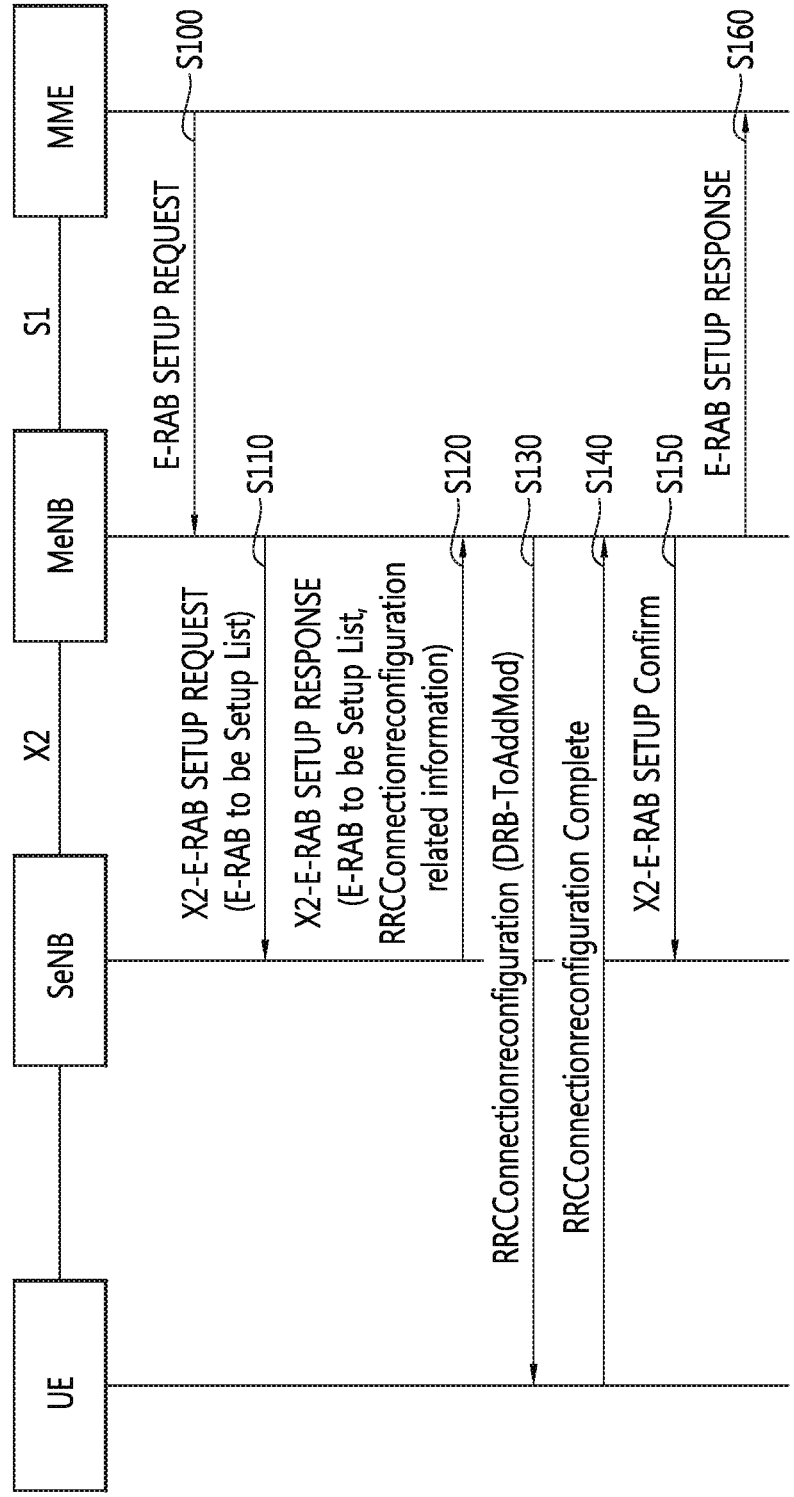
FIG. 14 shows an example of a method for establishing DRBs of an SeNB in dual connectivity according to an embodiment of the present invention.

FIG. 14 shows an example of a method for establishing DRBs of an SeNB in dual connectivity according to an embodiment of the present invention.

In step S100, the MME transmits the E-RAB SETUP REQUEST message to the MeNB. The E-RAB SETUP REQUEST message may include information on E-RABs to be set up, i.e., the E-RAB ID IE and E-RAB level QoS parameters IE, as described above in FIG. 11.

In step S110, upon receiving the E-RAB SETUP REQUEST message, the MeNB transmits a request message, which includes the information on E-RABs to be set up (i.e., the E-RAB ID IE and E-RAB level QoS parameters IE) in the E-RAB SETUP REQUEST message, to the SeNB through an X2 interface. The request message may be newly defined. In the embodiment of the present invention, the request message may be called an X2-E-RAB SETUP REQUEST message. The X2-E-RAB SETUP REQUEST message may be included in the existing X2 message. The X2-E-RAB SETUP REQUEST message may include an NAS PDU included in the E-RAB SETUP REQUEST message received from the MME.

Upon receiving the X2-E-RAB SETUP REQUEST message, the SeNB maps QoS of EPS bearers to Qos of radio bearers. In step S120, the SeNB transmits a response message, which includes the information on E-RABs to be set up and information related to RRC connection reconfiguration, to the MeNB through the X2 interface. The response message may be newly defined. In the embodiment of the present invention, the response message may be called an X2-E-RAB SETUP RESPONSE message. The information related to RRC connection reconfiguration may include Radio Bearer Qos, Session Management Request (NAS PDU), EPS RB Identity, etc.

The information related to RRC connection reconfiguration included in the X2-E-RAB SETUP RESPONSE message may include information included in DRB-ToAddMod shown in Table 1.

TABLE 1

```
DRB-ToAddMod ::=   SEQUENCE {
    eps-BearerIdentity      INTEGER (0..15)         OPTIONAL,    -- Cond
    DRB-Setup
        drb-Identity            DRB-Identity,
        pdcp-Config             PDCP-Config         OPTIONAL,    -- Cond PDCP
        rlc-Config              RLC-Config          OPTIONAL,    -- Cond Setup
        logicalChannelIdentity  INTEGER (3..10)     OPTIONAL,    -- Cond
    DRB-Setup
        logicalChannelConfig    LogicalChannelConfig OPTIONAL,   -- Cond Setup
        ...
}
```

The information related to RRC connection reconfiguration included in the X2-E-RAB SETUP RESPONSE message may further include information included in the E-RAB SETUP RESPONSE message shown in Table 2.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Setup List | | 0 . . . 1 | | | YES | ignore |
| >E-RAB Setup Item Ies | | 1 . . . <maxnoofE-RABs> | | | EACH | ignore |
| >>E-RAB ID | M | | | | — | |
| >>Transport Layer Address | M | | 9.2.2.1 | | — | |
| >>GTP-TEID | M | | 9.2.2.2 | eNB TEID. | — | |
| E-RAB Failed to Setup List | O | | E-RAB List 9.2.1.36 | A value for E-RAB ID shall only be present once in E-RAB | YES | ignore |

TABLE 2-continued

| IE/Group Name | Presence | Range | IE type and reference | Semantics description | Criticality | Assigned Criticality |
|---|---|---|---|---|---|---|
| | | | Setup List IE + in E-RAB Failed to Setup List IE. | | | |
| Criticality Diagnostics | O | | 9.2.1.21 | | YES | ignore |

In step S130, upon receiving the X2-E-RAB SETUP RESPONSE message, the MeNB transmits an RRCconnectionreconfiguration message, which includes the information related to RRC connection reconfiguration received via the X2-E-RAB SETUP RESPONSE message, to the UE. The RRCconnectionreconfiguration message may include an NAS message included in the E-RAB SETUP REQUEST message received from the MME. Further, the RRCconnectionreconfiguration message may indicate that corresponding DRBs correspond to the SeNB. This may be indicated by an E-UTRAN cell global identity (ECGI) of a cell served by the SeNB.

In step S140, upon receiving the RRCconnectionreconfiguration message, the UE transmits an RRCconnectionreconfiguration complete message to the MeNB in order to inform the MeNB that corresponding DRBs are set up.

In step 150, upon receiving the RRCconnectionreconfiguration complete message, the MeNB transmit a confirm message to the SeNB through the X2 interface in order to inform the SeNB that the E-RAB setup procedure of the SeNB is completed. The confirm message may be newly defined. In the embodiment of the present invention, the confirm message may be called an X2-E-RAB SETUP CONFIRM message.

In step S160, the MeNB transmits the E-RAB SETUP RESPONSE message to the MME in order to inform the MME that E-RAB setup procedure of the SeNB is completed.

Figure 15:
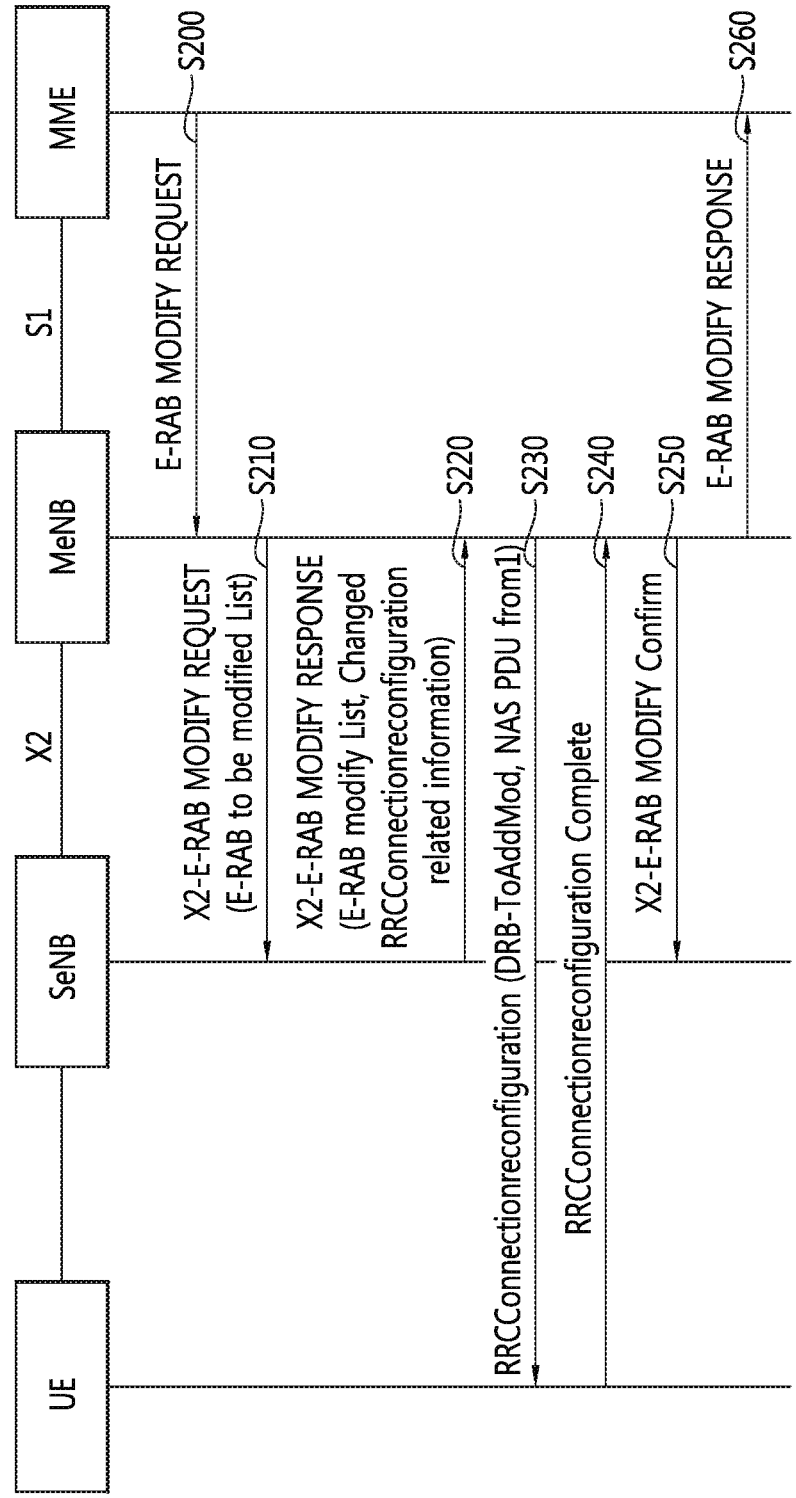
FIG. 15 shows an example of a method for modifying DRBs of an SeNB in dual connectivity according to an embodiment of the present invention.

FIG. 15 shows an example of a method for modifying DRBs of an SeNB in dual connectivity according to an embodiment of the present invention.

In step S200, the MME transmits the E-RAB MODIFY REQUEST message to the MeNB. The E-RAB MODIFY REQUEST message may include information on E-RABs to be modified, as described above in FIG. 12.

In step S210, upon receiving the E-RAB MODIFY REQUEST message, the MeNB transmits a request message, which includes the information on E-RABs to be modified in the E-RAB MODIFY REQUEST message, to the SeNB through an X2 interface. The request message may be newly defined. In the embodiment of the present invention, the request message may be called an X2-E-RAB MODIFY REQUEST message. The X2-E-RAB MODIFY REQUEST message may include an NAS PDU included in the E-RAB MODIFY REQUEST message received from the MME.

In step S220, upon receiving the X2-E-RAB MODIFY REQUEST message, the SeNB transmits a response message, which includes the information on E-RABs to be modified and information related to changed RRC connection reconfiguration, to the MeNB through the X2 interface. The response message may be newly defined. In the embodiment of the present invention, the response message may be called an X2-E-RAB MODIFY RESPONSE message. The information related to changed RRC connection reconfiguration included in the X2-E-RAB MODIFY RESPONSE message may include information included in DRB-ToAddMod shown in Table 1.

In step S230, upon receiving the X2-E-RAB MODIFY RESPONSE message, the MeNB transmits an RRCconnectionreconfiguration message, which includes the information related to changed RRC connection reconfiguration received via the X2-E-RAB MODIFY RESPONSE message, to the UE. The RRCconnectionreconfiguration message may include an NAS message included in the E-RAB MODIFY REQUEST message received from the MME.

In step S240, upon receiving the RRCconnectionreconfiguration message, the UE transmits an RRCconnectionreconfiguration complete message to the MeNB in order to inform the MeNB that corresponding DRBs are modified.

In step 250, upon receiving the RRCconnectionreconfiguration complete message, the MeNB transmit a confirm message to the SeNB through the X2 interface in order to inform the SeNB that the E-RAB modification procedure of the SeNB is completed. The confirm message may be newly defined. In the embodiment of the present invention, the confirm message may be called an X2-E-RAB MODIFY CONFIRM message.

In step S260, the MeNB transmits the E-RAB MODIFY RESPONSE message to the MME in order to inform the MME that E-RAB modification procedure of the SeNB is completed.

Figure 16:
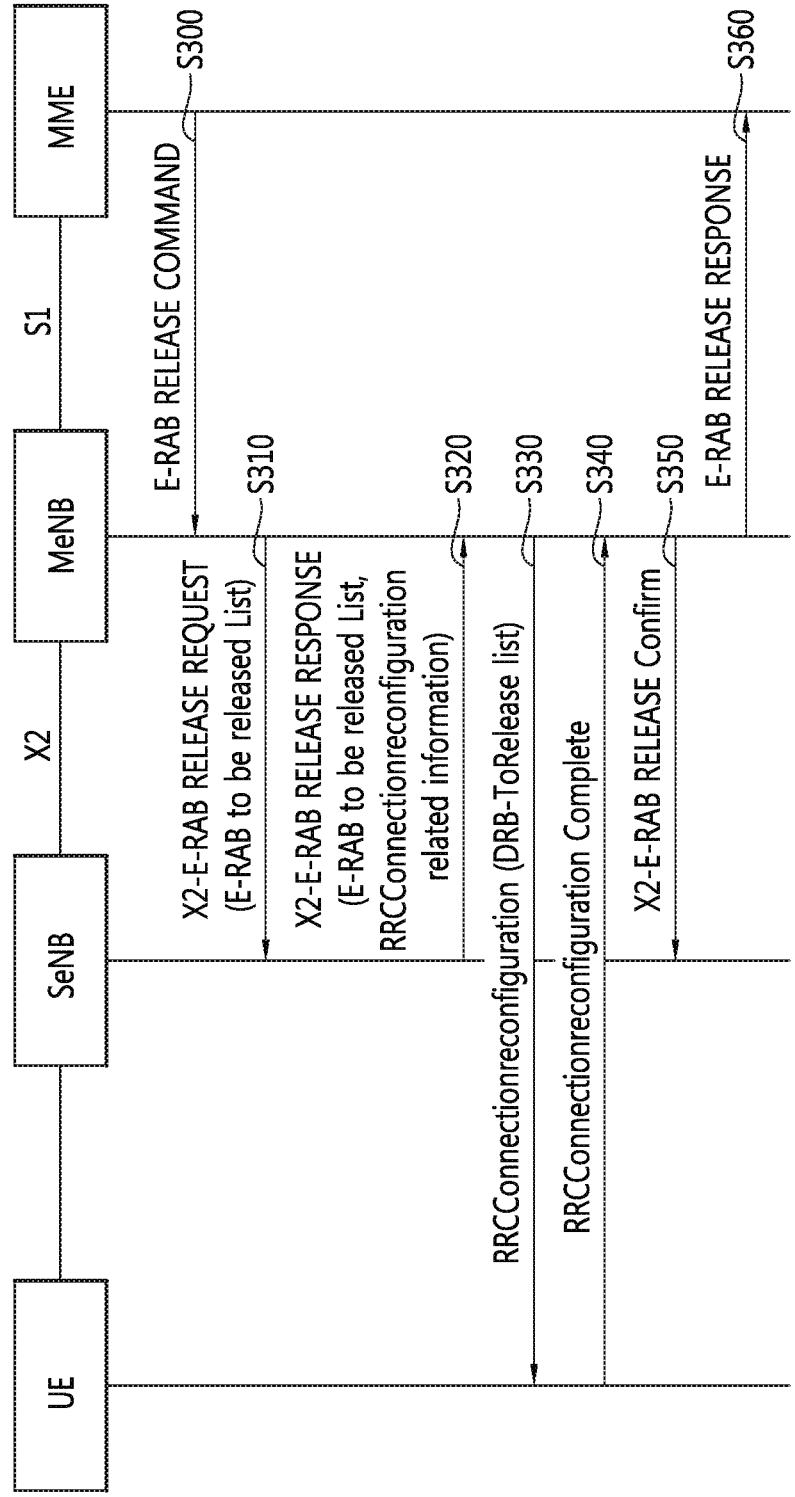
FIG. 16 shows an example of a method for releasing DRBs of an SeNB in dual connectivity according to an embodiment of the present invention.

FIG. 16 shows an example of a method for releasing DRBs of an SeNB in dual connectivity according to an embodiment of the present invention.

In step S300, the MME transmits the E-RAB RELEASE COMMAND message to the MeNB. The E-RAB RELEASE COMMAND message may include information on E-RABs to be released, as described above in FIG. 13.

In step S310, upon receiving the E-RAB RELEASE COMMAND message, the MeNB transmits a request message, which includes the information on E-RABs to be released in the E-RAB RELEASE COMMAND message, to the SeNB through an X2 interface. The request message may be newly defined. In the embodiment of the present invention, the request message may be called an X2-E-RAB RELEASE COMMAND message.

In step S320, upon receiving the X2-E-RAB RELEASE COMMAND message, the SeNB transmits a response message, which includes the information on E-RABs to be released and information related to RRC connection reconfiguration, to the MeNB through the X2 interface. The response message may be newly defined. In the embodiment of the present invention, the response message may be called an X2-E-RAB RELEASE RESPONSE message. The information related to RRC connection reconfiguration included in the X2-E-RAB RELEASE RESPONSE message may include information included in DRB-ToReleaseList.

In step S330, upon receiving the X2-E-RAB RELEASE RESPONSE message, the MeNB transmits an RRCconnectionreconfiguration message, which includes the information related to RRC connection reconfiguration received via the X2-E-RAB RELEASE RESPONSE message, to the UE.

In step S340, upon receiving the RRCconnectionreconfiguration message, the UE transmits an RRCconnectionreconfiguration complete message to the MeNB in order to inform the MeNB that corresponding DRBs are released.

In step 350, upon receiving the RRCconnectionreconfiguration complete message, the MeNB transmit a confirm message to the SeNB through the X2 interface in order to inform the SeNB that the E-RAB release procedure of the SeNB is completed. The confirm message may be newly defined. In the embodiment of the present invention, the confirm message may be called an X2-E-RAB RELEASE CONFIRM message.

In step S360, the MeNB transmits the E-RAB RELEASE RESPONSE message to the MME in order to inform the MME that E-RAB release procedure of the SeNB is completed.

Figure 17:
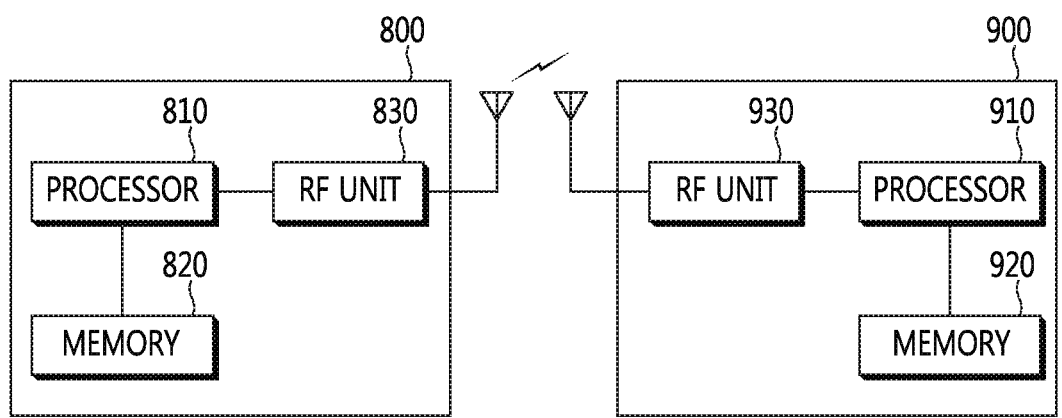
FIG. 17 shows a wireless communication system to implement an embodiment of the present invention.

FIG. 17 shows a wireless communication system to implement an embodiment of the present invention.

An MeNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An SeNB or a UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing, by a master eNodeB (MeNB) in dual connectivity, data radio bearers (DRBs) in a wireless communication system, the method comprising:
   receiving an E-RAB setup request message from a mobility management entity (MME);
   transmitting a request message, which includes information on E-UTRAN radio access bearers (E-RABs) to be set up, to a secondary eNB (SeNB) in dual connectivity through an X2 interface;
   receiving a response message, which includes radio resource control (RRC) connection reconfiguration related information based on the E-RABs to be set up, as a response to the request message from the SeNB through the X2 interface; and
   upon receiving the response message, transmitting an RRC connection reconfiguration message, which includes the RRC connection reconfiguration related information received via the response message, to a user equipment (UE).

2. The method of claim 1, wherein the request message is a newly defined X2-E-RAB setup request message.

3. The method of claim 1, wherein the request message is included in an existing X2 message.

4. The method of claim 1, wherein the response message is a newly defined X2-E-RAB setup response message.

5. The method of claim 1, wherein the RRC connection reconfiguration related information includes at least one of a radio bearer quality of service (QoS), a session management request, and an evolved packet system (EPS) RB identity.

6. The method of claim 1, wherein the RRC connection reconfiguration message indicates that corresponding DRBs correspond to the SeNB.

7. The method of claim 1, further comprising:
   receiving an RRC connection reconfiguration complete message from the UE.

8. The method of claim 1, further comprising:
   transmitting a newly defined X2-E-RAB setup confirm message, which informs the SeNB that E-RAB setup procedure of the SeNB is completed, to the SeNB through the X2 interface.

9. A method for modifying, by a master eNodeB (MeNB) in dual connectivity, data radio bearers (DRBs) in a wireless communication system, the method comprising:
   receiving an E-RAB modify request message from a mobility management entity (MME);
   transmitting an X2-E-RAB modify request message, which includes information on E-UTRAN radio access bearers (E-RABs) to be modified, to a secondary eNB (SeNB) in dual connectivity through an X2 interface;
   receiving an X2-E-RAB modify response message, which includes radio resource control (RRC) connection reconfiguration related information based on the E-RABs to be modified, as a response to the X2-E-RAB modify request message from the SeNB through the X2 interface; and upon receiving the X2-E-RAB modify response message, transmitting an RRC connection reconfiguration message, which includes the RRC connection reconfiguration related information received via the X2-E-RAB modify response message, to a user equipment (UE).

10. The method of claim 9, further comprising:
receiving an RRC connection reconfiguration complete message from the UE.

11. The method of claim 9, further comprising:
transmitting a newly defined X2-E-RAB modify confirm message, which informs the SeNB that E-RAB modification procedure of the SeNB is completed, to the SeNB through the X2 interface.

12. A method for releasing, by a master eNodeB (MeNB) in dual connectivity, data radio bearers (DRBs) in a wireless communication system, the method comprising:
receiving an E-RAB release command message from a mobility management entity (MME);
transmitting an X2-E-RAB release command message, which includes information on E-UTRAN radio access bearers (E-RABs) to be released, to a secondary eNB (SeNB) in dual connectivity through an X2 interface;
receiving an X2-E-RAB release response message, which includes radio resource control (RRC) connection reconfiguration related information based on the E-RABs to be released, as a response to the X2-E-RAB release command message from the SeNB through the X2 interface; and
upon receiving the X2-E-RAB release response message, transmitting an RRC connection reconfiguration message, which includes the RRC connection reconfiguration related information received via the X2-E-RAB release response message, to a user equipment (UE).

13. The method of claim 12, further comprising:
receiving an RRC connection reconfiguration complete message from the UE.

14. The method of claim 12, further comprising:
transmitting a newly defined X2-E-RAB release confirm message, which informs the SeNB that E-RAB release procedure of the SeNB is completed, to the SeNB through the X2 interface.

* * * * *